Figure 1:
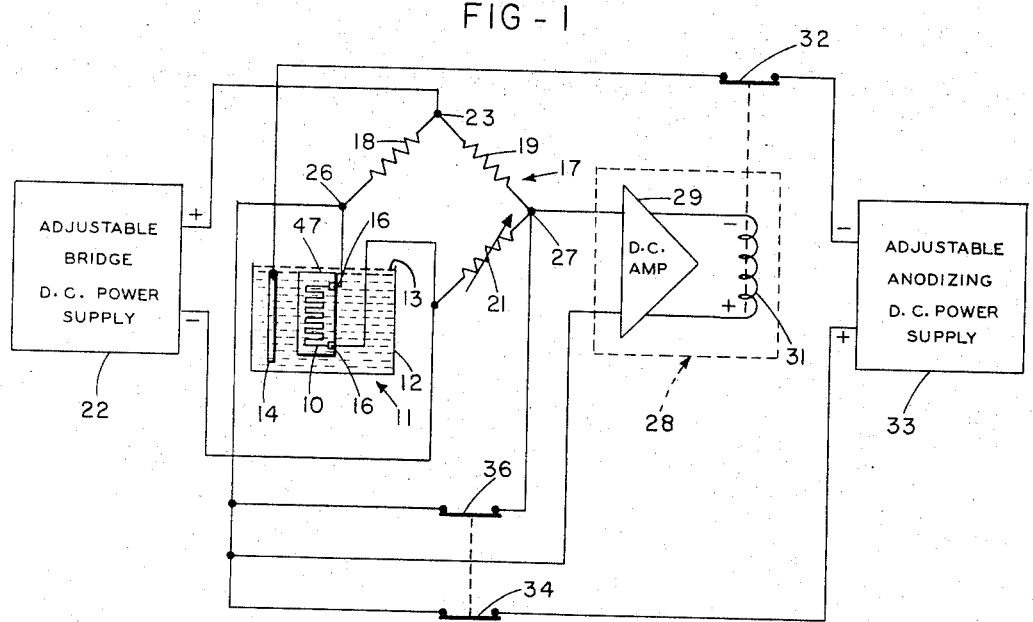

Sept. 12, 1967     E. A. LA CHAPELLE     3,341,444

ANODIZATION CONTROL CIRCUITS

Filed Sept. 1, 1964

INVENTOR
E. A. LA CHAPELLE

By *M. Pfeffer*

ATTORNEY

United States Patent Office 3,341,444
Patented Sept. 12, 1967

3,341,444
ANODIZATION CONTROL CIRCUITS
Edward A. La Chapelle, Flemington, N.J., assignor to Western Electric Company, Incorporated, New York, N.Y., a corporation of New York
Filed Sept. 1, 1964, Ser. No. 393,705
8 Claims. (Cl. 204—228)

This invention relates to anodization control circuits, and more particularly to circuits for anodizing a metal object to increase the resistance thereof to a desired value. Accordingly, the general objects of this invention are to provide new and improved circuits of such character.

In the manufacture of thin-film resistors, a thin-film of metal, such as tantalum, is deposited on a dielectric substrate. Thereafter, a desired resistor configuration is generated by selectively masking a portion of the metal film with an etch resistant material, and then etching the film to remove the unmasked portions thereof. The dimensions of the resistor thus formed determine its resistance value.

Because of difficulties encountered in accurately controlling the film deposition to the degree required to produce highly accurate resistors, it has been found desirable to deposit the film such that the resultant resistor after etching will have a value approximating, but less than, the desired value. The resistor is then brought up to value by subjecting it to an anodization process. Anodization oxidizes the film, thereby reducing its effective thickness and, hence, its cross sectional area. This, of course, results in an increase in the film resistance.

One of the problems encountered in the anodization is termination of the process when the resistor has reached its desired value. Thus, if the process is prematurely terminated, the resistor will be below the desired value and, conversely, if the resistor is over anodized, its resistance will be greater than the desired value. Accurate termination, however, generally requires some type of resistance monitoring. This, on the other hand, is complicated by the flow of anodizing current through the resistor which, of course, must be taken into account in any attempt to test the resistance of the resistor during anodization.

It is, therefore, another object of this invention to provide new and improved circuits for anodizing a thin-film resistor to increase its resistance to a desired value, which circuits are particularly efficacious in solving the aforementioned problem, are automatic, and are highly accurate and efficient.

In accordance with the foregoing and other objects, a circuit embodying certain principles of the invention may include anodizing means and resistance testing means. Means are provided for alternately connecting the anodizing means and the resistance testing means to the object to alternately anodize the object and test the resistance thereof. Means, responsive to the resistance testing means, are provided for terminating the anodization when the object has reached a desired resistance value.

Figure 2:
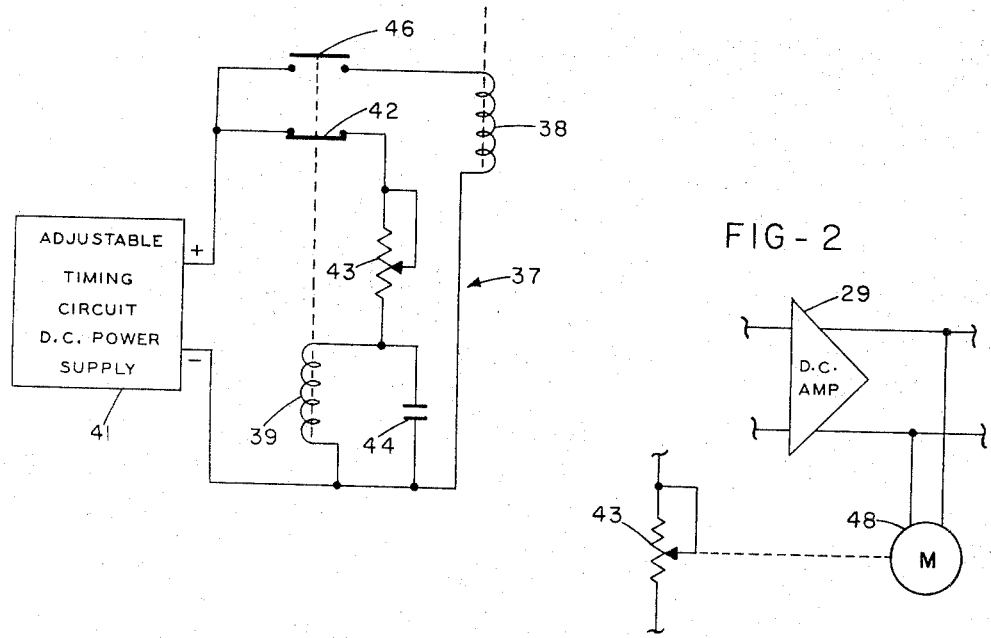

Other objects, advantages and features of the invention will be apparent from the following detailed description of specific embodiments thereof, when read in conjunction with the appended drawings, in which:

FIG. 1 illustrates schematically an anodizing circuit in accordance with the invention; and FIG. 2 is a modification of the circuit of FIG. 1 with portions removed for the sake of clarity.

Referring now to the drawings and, particularly to FIG. 1, a metal object to be anodized, such as a thin-film resistor 10, is shown as being incorporated as the anode of an electrolytic anodizing cell 11, which includes a tank 12, an electrolyte 13 and a cathode 14.

Additionally, the resistor 10 is connected via low ohmic contacts 16—16 provided at its end points to a suitable resistance testing circuit, such as a Wheatstone bridge 17, the resistor 10 forming one arm of the bridge. The other three arms of the bridge include two fixed resistors 18 and 19 and a variable resistor 21. A constant-voltage D.C. power supply 22 is connected across a first pair of opposed junction points 23 and 24 of the bridge 17 to supply testing current to the bridge. The output of the bridge 17 is derived from a second pair of opposed junction points 26 and 27 and fed to a suitable detector 28. In this instance, the detector 28 includes a D.C. amplifier 29 for amplifying the very weak signal which appears at the bridge output 26–27 when the bridge is very close to a balanced condition, and a suitable voltage responsive device, such as a relay 31, which is coupled to the output of the amplifier and which energizes when the voltage applied to the positive terminal thereof is of a higher magnitude than the voltage applied to the negative terminal thereof. Upon energization, the relay 31 functions to open a normally closed contact 32 and terminate the anodization, as will be explained in more detail hereinbelow. It should suffice to say at this point that the values of the bridge resistors 18, 19 and 21 are selected such that when the resistor 10 achieves its desired value, the bridge 17 is balanced and, when the resistor is less than the desired value, the positive terminal of the relay 31 is lower in potential than the negative terminal thereof whereby the relay 31 remains de-energized. However, as the bridge goes through a null or balanced condition, the polarity of the signal applied to the relay 31 reverses and causes the relay to energize.

An adjustable constant-voltage D.C. anodizing supply 33, included in a circuit with the resistor 10 and the cathode 14, is provided for supplying anodizing potential to the cell 11 to anodize the resistor. As mentioned above the flow of anodizing current through the resistor 10 precludes accurate, simultaneous testing of the resistance thereof. In this instance, this is because the bridge 17 cannot distinguish between the anodizing current from the anodizing supply 33 and the testing current from the bridge supply 22. Other resistance testing devices, such as ohmmeters for example, are presented with a similar problem.

To avoid this problem, a first normally closed contact 34 is connected between the positive terminal of the anodizing supply 33 and the resistor 10, and a second normally closed contact 36, is connected across the junction points 26 and 27 of the bridge 17. When both of the contacts 34 and 36 are closed, as shown, the contact 34 connects the anodizing supply 33 to the resistor 10 to supply anodizing energy thereto, while the contact 36 shorts the output 26–27 of the bridge 17 to preclude an erroneous energization of the relay 31. Conversely, when both of the contacts 34 and 36 are open, the anodizing supply 33 is disconnected from the resistor 10, and the bridge output 26–27 is fed to the amplifier 29. Suitable means, such as a timing circuit 37 to be described shortly, is provided for alternately closing and opening the contacts 34 and 36.

The negative terminal of the anodizing supply 33 is connected to the cathode 14 through the normally closed contact 32. It will be recalled from above that the contact 32 remains closed until the bridge 17 balances, at which time it opens. As is seen, opening of the contact 32 disconnects the anodizing supply 33 from the cathode 14 and precludes any further anodization.

The timing circuit 37 includes a relay 38 for operating the contacts 34 and 36, and a relay 39 for controlling the operation of the relay 38. More specifically, the relay 39 is energizable through a circuit which includes an adjustable constant-voltage D.C. power supply 41, a normally closed contact 42 of the relay 39 and a variable resistor 43. A capacitor 44 is connected in parallel with the relay 39. The resistor 43 and the capacitor 44 form a first time delay network for energization of the relay 39. Upon energization of the relay 39, the contact 42 opens to initiate de-energization of the relay 39. De-energization of the relay 39 is delayed by virtue of the time necessary for the capacitor 44 to discharge through the coil of the relay 39 and, accordingly, the parallel combination of the coil of the relay 39 and the capacitor 44 forms a second time delay network.

Additionally, upon energization of the relay 39, a normally open contact 46 thereof closes to energize the relay 38 which, when energized, opens the contacts 34 and 36.

When the voltage of the capacitor 44 falls below the holding voltage of the relay 39, the relay 39 de-energizes, resulting in a reopening of the contact 46 and a reclosing of the contact 42. Reopening of the contact 46 results in de-energization of the relay 38 and, hence, in a reclosure of the contacts 34 and 36. Reclosure of the contact 42 completes the energizing circuit of the relay 39, and thereby initiates another timing cycle. The parameters of the timing circuit 37, that is, the output voltage of the supply 41 and the values of the resistor 43 and the capacitor 44, are selected in accordance with desired anodizing and resistance testing times.

In order to prevent transients from erroneously actuating the relay 31, it is desirable that the bridge output 26–27 remain shorted during disconnection of the anodizing supply 33. Advantageously, this may be accomplished by delaying the opening of the contact 36. This is conveniently effected, in this embodiment, by employing a relay 38 of the type having individually adjustable armatures, and adjusting the armatures such that the contact 34 opens before the contact 36.

*Example*

In a specific example, the thin-film resistor 10 is composed of tantalum and is mounted on a suitable dielectric substrate 47, such as glass; the contacts 16—16 comprise successive layers of a nickel-chromium alloy, copper and gold; the electrolyte is deionized water with .01% acetic acid, and the cathode is tantalum.

In order to effectively anodize the resistor 10, it is necessary to mask the low ohmic contacts 16—16 from the electrolyte 13. Otherwise, the contacts 16—16 would provide a by-pass path for the anodizing current and thereby preclude anodization of the resistor 10. One especially suitable means for accomplishing the masking is disclosed in the co-pending application of Richard D. Sutch, Ser. No. 346,243, filed Feb. 30, 1964, and assigned to the assignee of the present application.

Typically, the initial value of the resistor 10 is 970 ohms; its desired value is 1000 ohms; and the timing circuit 37 is set such that the closure time of the contacts 34 and 36 (i.e., the anodizing period) is 50 milliseconds and the open time of the contacts (i.e., the resistance testing period) is 125 milliseconds. With these values and the anodizing supply set to 100 volts, the resistor 10 is anodized to its desired value in approximately 1 minute.

*Operation*

Initially with the apparatus in the condition shown in FIG. 1, the anodizing supply 33 is connected through the contact 34 to the cell 11 and is supplying anodizing current thereto. As a result, the surface of the thin-film resistor 10 is oxidized; more specifically, the surface of the resistor 10 is being converted to tantalum pentoxide. Accordingly, the effective thickness of the tantalum film is reduced with a concomitant increase in resistance. Concurrently, the capacitor 44 is being charged through the resistor 43 toward the operating voltage of the relay 39. During this time, the contact 36 shorts the output 26–27 of the bridge 17 to preclude erroneous actuation of the relay 31. When the voltage of the capacitor 44 attains the operating voltage of the relay 39, the relay 39 energizes, whereupon the contact 42 opens to initiate de-energization of the relay 39 and the contact 46 closes to energize the relay 38.

Energization of the relay 38 opens the contacts 34 and 36 in the sequence set out above. Accordingly, first the anodizing power supply 33 is disconnected from the resistor 10, and then the output 26–27 of the bridge 17 is applied to the amplifier 29. Initially, since the resistance of the resistor 10 is less than the desired value thereof, the bridge 17 is unbalanced and a relatively large voltage appears at the output 26–27, with the junction point 27 being higher in potential than the junction point 26. This voltage is applied to the amplifier 29 and, thence, to the relay 31. Since this signal results in the positive terminal of the relay 31 being at a lower potential than the negative terminal thereof, the relay 31 remains de-energized.

Upon de-energization of the relay 39, the contact 46 reopens and the contact 42 recloses. Reopening of the contact 46 terminates the resistance testing period, and reclosure of the contact 42 initiates another anodization and resistance testing cycle. The foregoing cycle continues periodically until the resistor 10 attains a value slightly greater than the preset value thereof, whereupon during the next resistance testing period, the polarity of the signal applied to the relay 31 reverses with a magnitude sufficient to energize the relay 31. Accordingly, the relay 31 energizes to open the contact 32 and disconnect the negative terminal of the anodizing supply 33 from the cathode 14, thereby precluding any further anodization.

In some instances, it may be desirable to decrease the total anodization time by employing longer anodizing periods at the start of the operation and progressively decreasing the anodizing periods as the resistor 10 approaches the desired value. This can easily be effected in the instant embodiment by automatically changing the timing of the timing circuit 37. One convenient way of accomplishing this, as seen in FIG. 2, is to connect a servomotor 48 to the output of the amplifier 29 and to mechanically couple this motor to the arm of the variable resistor 43 such that the variable resistor is driven from a setting of high delay to one of short delay. Alternatively, the motor 48 could be employed to progressively increase the output voltage of the timing circuit power supply 41. Other ways of accomplishing progressively decreasing anodizing time periods should be equally evident to those skilled in the art.

It should be noted that the use of a constant voltage anodizing supply 33, in the instant embodiment, has the advantage that as the anodization proceeds and the resistance of the resistor 10, as well as that of the overlying oxide layer increases, the current through the cell 11 decreases. Since the current through the cell 11 determines the rate of anodization, a progressively decreasing current results in a progressively decreasing anodization rate, thereby reducing the likelihood of a substantial overshoot in the desired value of the resistor 10. Of course, where the anodization periods are progressively decreased as set out above, it may be possible, and perhaps even desirable, to use a constant current source in lieu of the constant voltage source 33.

Related anodizing control circuits are disclosed in the co-pending application of Allen R. Gerhard, Ser. No. 394,104, filed Sept. 1, 1964, and assigned to the assignee of the present application.

It is to be understood that the above described embodiments are merely illustrative of the principles of the invention. Other embodiments may be devised by persons skilled in the art which embody these principles and fall within the spirit and scope thereof.

What is claimed is:

1. A circuit for anodizing a metal object in an electrolytic anodizing cell to increase the resistance of said object to a desired value, which comprises:

means for supplying anodizing current to the cell to anodize the object and thereby increase its resistance;
means for testing the resistance of the object;
means cyclically rendered effective for alternately and automatically switching the current supplying means across the cell and then across the resistance testing means into testing relationship with the object to alternately anodize the object and test the resistance thereof; and
means, responsive to the resistance testing means, for indicating when the object has reached the desired resistance value.

2. A circuit according to claim 1, wherein the resistance testing means includes a Wheatstone bridge and the object is connected to and forms one arm of said bridge.

3. A circuit according to claim 2, wherein the switching means includes:
a first normally closed contact connected between the current supplying means and the cell;
a second normally closed contact connected across the output of the bridge for selectively shorting the bridge output; and
timer means for alternately closing and opening the contacts so that when both of the contacts are closed the first contact connects the current supplying means to the cell to anodize the object, while the second contact shorts the bridge output, and when both contacts are open, the first contact disconnects the current supplying means from the cell to discontinue anodizing while the second contact removes the short from the bridge output to enable testing of the resistance of the object.

4. A circuit in accordance with claim 3, wherein the timer means is of the type providing progressively shorter intervals between successive closures and openings of the first and second contacts to provide longer anodization periods at the start of anodization and shorter anodization periods as the object approaches its desired resistance value.

5. A circuit in accordance with claim 3, wherein the timer means includes:
a first relay for simultaneously operating the first and second contacts;
a second relay for controlling the operation of the first relay; and
means for operating the second relay, said means including a normally closed contact of the second relay, a first time delay network for delaying energization of the second relay and a second time delay network for delaying de-energization of the second relay.

6. A circuit for automatically anodizing a metal object in an electrolytic anodizing cell to increase the resistance of said object to a desired value, which comprises:
a source of anodizing potential for supplying anodizing current to the cell to anodize the object and thereby increase its resistance;
an automatic timer;
a first switching circuit, operated by the timer, for cyclically connecting the source of anodizing potential across the cell during a first phase of each cycle and for disconnecting that source during a second phase;
a circuit for testing the resistance of the object, including a source of testing potential for passing a test current through the object, and a detector, responsive to the voltage drop across the object resulting from the test current, for indicating when the desired resistance value has been reached;
a second switching circuit, operated by the timer, for cyclically connecting the testing circuit to the object during the second phase of each cycle to test the resistance during each time period when anodizing current is not flowing through the cell and for disconnecting the testing circuit during the first phase of each cycle; and
means, operated by the detector, for terminating the anodization of the object when the object has reached the desired resistance value.

7. A circuit as recited in claim 6, wherein means are provided for setting the time of operation of the second switching circuit so that it operates a predetermined time after the operation of the first switching circuit at the end of the first phase of each cycle, to allow dissipation of transient currents in the object before the testing circuit is connected thereto.

8. A circuit for automatically anodizing a metal object in an electrolytic anodizing cell to increase the resistance of said object to a desired value, which comprises:
a constant-voltage D.C. supply for supplying anodizing energy to the cell to anodize the object and thereby increase the resistance thereof;
means including first and second normally closed contacts for selectively connecting the supply across the cell;
a D.C. Wheatstone bridge, including as one of the arms thereof the object, said bridge being set such that when the object reaches the desired resistance value, the output of the bridge changes in polarity;
means including a third normally closed contact for selectively shorting the output of said bridge;
timer means for repetitively closing and opening the second and third contacts to alternately first connect the supply to the cell to anodize the object and short the bridge output, and then to disconnect the supply from the cell and remove the short from the bridge output; and
detector means connected to the bridge output and operable during the open time of the second and third contacts for detecting a change in the polarity of the bridge output, indicating that the resistance of the object has attained its desired value, and for opening the first contact upon said change in polarity to terminate the anodizing.

References Cited

UNITED STATES PATENTS

| | | | |
|---|---|---|---|
| 3,148,129 | 9/1964 | Basseches et al. | 204—228 X |
| 3,254,014 | 5/1966 | Daddona | 204—228 |

JOHN H. MACK, *Primary Examiner.*

D. R. VALENTINE, *Assistant Examiner.*